United States Patent
Cizdziel et al.

(10) Patent No.: US 11,647,524 B2
(45) Date of Patent: *May 9, 2023

(54) BYPASSING RADAR IN WIDE DYNAMIC FREQUENCY SELECTION (DFS) CHANNELS UTILIZING PUNCTURING

(71) Applicant: Cisco Technology, Inc., San Jose, CA (US)

(72) Inventors: Benjamin Jacob Cizdziel, San Jose, CA (US); Brian D. Hart, Sunnyvale, CA (US); Pooya Monajemi, Irvine, CA (US); David Kloper, Santa Clara, CA (US)

(73) Assignee: CISCO TECHNOLOGY, INC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/521,327

(22) Filed: Nov. 8, 2021

(65) Prior Publication Data

US 2022/0061044 A1 Feb. 24, 2022

Related U.S. Application Data

(63) Continuation of application No. 16/504,972, filed on Jul. 8, 2019, now Pat. No. 11,172,484.

(60) Provisional application No. 62/695,558, filed on Jul. 9, 2018.

(51) Int. Cl.
*H04W 72/04* (2009.01)
*H04L 5/00* (2006.01)
*H04W 72/0453* (2023.01)
*H04W 72/08* (2009.01)

(52) U.S. Cl.
CPC ........ *H04W 72/048* (2013.01); *H04L 5/0062* (2013.01); *H04W 72/0453* (2013.01); *H04W 72/085* (2013.01)

(58) Field of Classification Search
CPC .......... H04W 72/048; H04W 72/0453; H04W 72/085; H04L 5/0062
See application file for complete search history.

(56) References Cited

U.S. PATENT DOCUMENTS

| | | | |
|---|---|---|---|
| 2017/0026847 A1* | 1/2017 | Farshchian | G01S 7/021 |
| 2017/0094651 A1* | 3/2017 | Green | H04W 74/002 |
| 2017/0311171 A1* | 10/2017 | Kurian | H04W 24/08 |
| 2017/0325210 A1* | 11/2017 | Green | H04W 72/0453 |
| 2018/0054739 A1* | 2/2018 | Dutta | H04W 74/0808 |
| 2018/0242182 A1* | 8/2018 | Rashid | H04W 88/06 |
| 2019/0007180 A1* | 1/2019 | Shi | H04L 5/0046 |

(Continued)

*Primary Examiner* — Saad A. Waqas
(74) *Attorney, Agent, or Firm* — Merchant & Gould P.C.

(57) ABSTRACT

Bypassing radar in wide Dynamic Frequency Selection (DFS) channels utilizing puncturing may be provided. A first client device may be classified as eligible for puncturing and a second client device may be classified as not eligible for puncturing. Next, it may be determined that a subchannel in a bandwidth range should not be used. Then, in response to determining that the subchannel in the bandwidth range should not be used, the first client device may be steered to a first subset of the bandwidth range and the second client device may be steered to a second subset of the bandwidth range. The second subset of the bandwidth range may be smaller than the first subset of the bandwidth range.

15 Claims, 4 Drawing Sheets

(56) References Cited

U.S. PATENT DOCUMENTS

2019/0254047 A1* 8/2019 Ahmed ............. H04W 28/0231
2019/0261369 A1* 8/2019 Verma ................. H04B 7/0619
2020/0008158 A1* 1/2020 Yamamoto .......... H04W 52/365

* cited by examiner

BYPASSING RADAR IN WIDE DYNAMIC FREQUENCY SELECTION (DFS) CHANNELS UTILIZING PUNCTURING

RELATED APPLICATION

This application is a continuation of Ser. No. 16/504,972 filed Jul. 8, 2019, and under provisions of 35 U.S.C. § 119(e), claims the benefit of U.S. Provisional Application No. 62/695,558 filed Jul. 9, 2018, the disclosures of both are incorporated herein by reference.

TECHNICAL FIELD

The present disclosure relates generally to wireless access points.

BACKGROUND

In computer networking, a wireless Access Point (AP) is a networking hardware device that allows a Wi-Fi compliant client device to connect to a wired network and to communicate with other client devices directly over Wi-Fi. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Bypassing radar in wide Dynamic Frequency Selection (DFS) channels utilizing puncturing may be provided. A first client device may be classified as eligible for puncturing and a second client device may be classified as not eligible for puncturing. Next, it may be determined that a subchannel in a bandwidth range should not be used. Then, in response to determining that the subchannel in the bandwidth range should not be used, the first client device may be steered to a first subset of the bandwidth range and the second client device may be steered to a second subset of the bandwidth range. The second subset of the bandwidth range may be smaller than the first subset of the bandwidth range.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

When APs (e.g., 802.11 APs) operating in Dynamic Frequency Selection (DFS) channels detect the presence of radar on their operating channel, they may take one of two approaches. The first approach may be to switch to a different channel (e.g., possibly non-DFS). The second approach may be to lower the Basic Service Set (BSS) bandwidth to avoid the radar if the radar was detected on a non-primary channel. While compliant with the regulations, these approaches may suffer from inefficiency in spectrum utilization if the original bandwidth of operation is large. For example, if the original bandwidth of operation is 80 MHz, switching to a different channel may lose the entire 80 MHz, and lowering the bandwidth may lose between 40 MHz and 60 MHz of the spectrum, while in both cases less than 20 MHz may be affected by the radar.

Some standards (e.g., 802.11ax) may support a puncturing process in which certain subcarriers in the operating bandwidth may be muted. For example, an AP may announce a BSS-wide mandate to mute these subcarriers. This process may address the DFS issue, but only when all client devices in a BSS support the puncturing feature. However, legacy clients may not support the puncturing feature. Furthermore, standards may not take into account a client device's filtering qualities on the punctured subcarriers or actual regulatory requirements or interpretations. A client device's poor filtering may result in the violation of regulations if radar is present.

To address the aforementioned issues, embodiments of the disclosure may provide multiple processes by which an AP may utilize puncturing to avoid collision with a detected radar in a large bandwidth. For example, embodiments of the disclosure may: i) classify the filtering quality of client devices using puncturing; and ii) maintain service for client devices that do not support puncturing, while still utilizing the available bandwidth to the advantage of client devices that do support puncturing.

Figure 1:
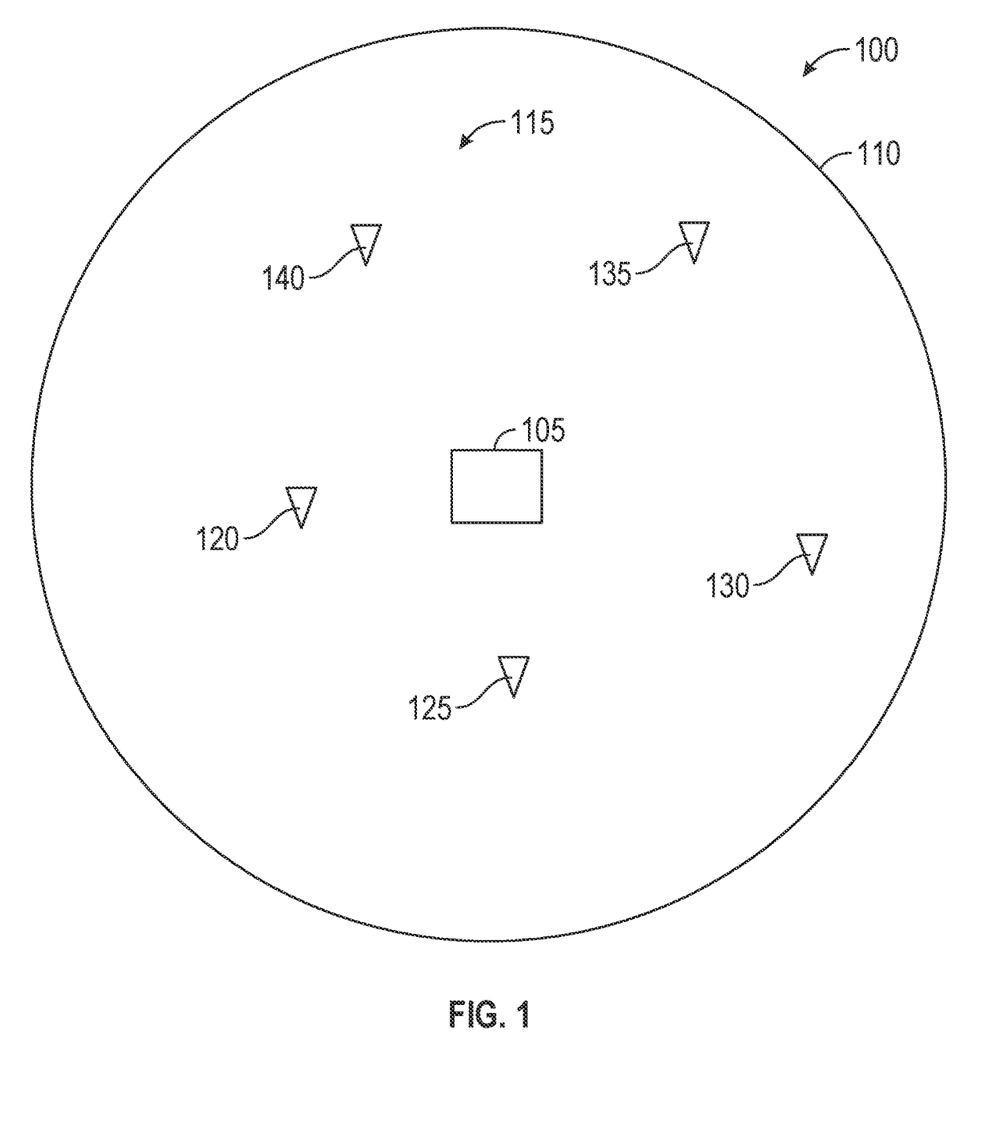
FIG. 1 is a block diagram of an operating environment.

FIG. 1 shows an operating environment 100. As shown in FIG. 1, operating environment 100 may comprise an Access Point (AP) 105, a micro cell 110, and a plurality of client devices 115. AP 105 may provide wireless network access for plurality of client devices 115 and micro cell 110 may illustrate the coverage area of AP 105. Plurality of client devices 115 may comprise a first client device 120, a second client device 125, a third client device 130, a fourth client device 135, and a fifth client device 140. Each one of plurality of client devices 115 may comprise, but is not limited to, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device.

As stated above, some standards may include a puncturing process in which certain subcarriers in the bandwidth may be muted. With the puncturing process, an AP may announce this set of subcarriers for the BSS. This puncturing process may allow the client devices that support puncturing to utilize the entire bandwidth minus the radar subchannel that the radar was detected on, however legacy client devices may not support puncturing. Accordingly, embodiments of the disclosure may: i) classify client devices to determine eligibility for puncturing; and ii) maintain service for all client devices in a BSS (e.g., those that may be capable and eligible for puncturing and those that may not be). Embodiments of the disclosure may provide at least two embodiments, one embodiment that may require modification to standard (e.g., 802.11) specifications (i.e., new client-supported protocol) and one embodiment that may be free from specification dependence (i.e., in practice, minimal additional client support).

The elements described above of operating environment 100 (e.g., AP 105, first client device 120, second client device 125, third client device 130, fourth client device 135, and fifth client device 140) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
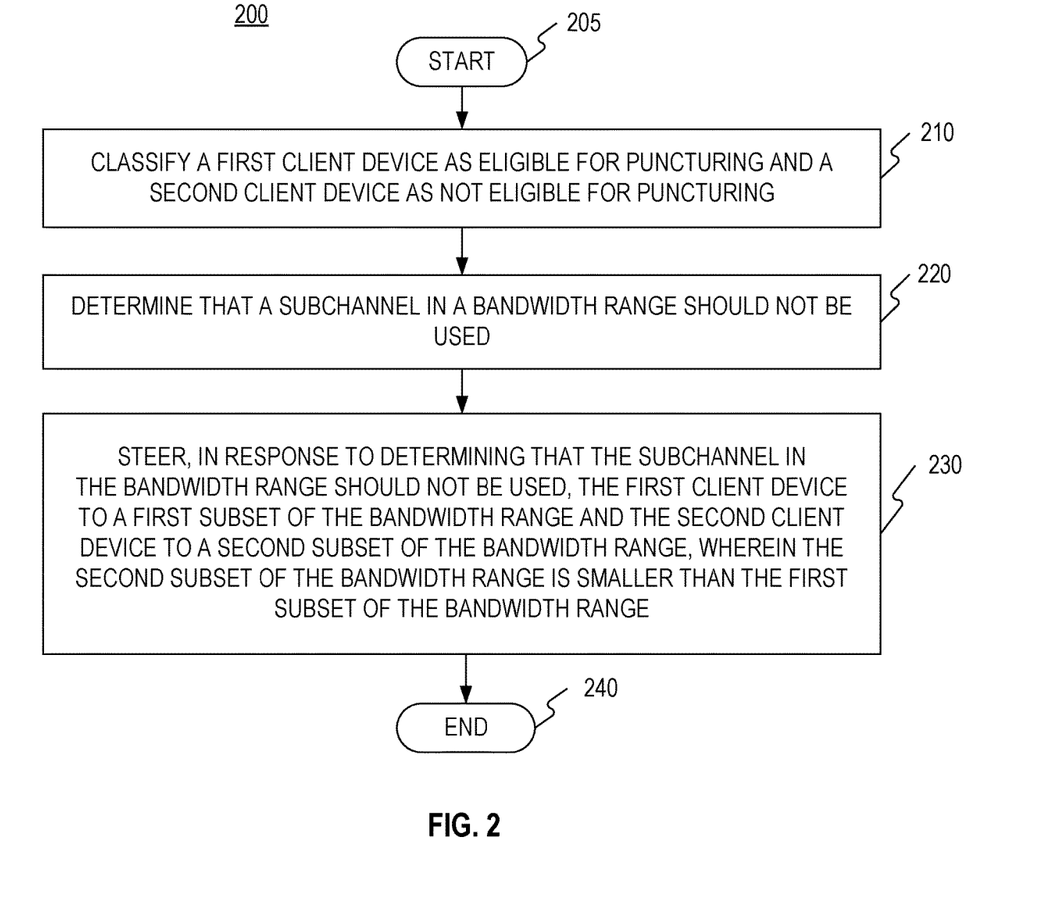
FIG. 2 is a flow chart of a method for bypassing radar in wide Dynamic Frequency Selection (DFS) channels utilizing puncturing.

FIG. 2 is a flow chart setting forth the general stages involved in a method 200 consistent with an embodiment of the disclosure for bypassing radar in wide Dynamic Frequency Selection (DFS) channels utilizing puncturing. Method 200 may be implemented using AP 105 as described in more detail above with respect to FIG. 1. Ways to implement the stages of method 200 will be described in greater detail below.

Method 200 may begin at starting block 205 and proceed to stage 210 where AP 105 may classify first client device 120 as eligible for puncturing and second client device 125 as not eligible for puncturing. For example, information reported by plurality of client devices 115 (e.g., Power Spectral Density (PSD) information) or information obtained by Over-the-Air (OTA) tests of plurality of client devices 115 may be used to determine which of plurality of client devices 115 may be classified as eligible for puncturing and which may be classified as not eligible for puncturing. Consistent with embodiments of the disclosure, eligible for puncturing may include both capable of puncturing and proving a Tx Mask when punctured that provides sufficient isolation at the occupied frequency of the radar for example.

Standards may provide a requirement for client device puncturing quality that may not be enough when applied to the DFS scenario in specific regulatory domains. Therefore, AP 105 may need to have additional information about the quality of a client device's filtering over the muted subcarriers, such as depth and width, before classifying a client device as eligible for puncturing. When radar is detected by AP 105, a decision may be made based on the radar signal's center frequency and bandwidth for example. Power spectral densities of the client devices may be taken into account along with the radar signal's center frequency and bandwidth for example. If the radar signal falls close to the edge and into an unacceptable level of power leakage from the client device's output spectrum, then the client device may not be considered eligible for puncturing. As will be described in greater detail below, information about a client device's filtering quality may be obtained by AP 105 via at least two routes: i) declared by the client device; or ii) measured by AP 105.

With respect to information about a client device's filtering quality being declared by the client device, embodiments of the disclosure may provide an information element that may be added to the standard specification and reported during association with AP 105. This may allow client devices to provide information (e.g., PSD information) that may describe the quality of filtering possible on their transmit chains when a subchannel is punctured. This information may be used by AP 105 to determine if any client device in plurality of client devices 115 is capable of utilizing the puncturing feature for the given radar.

The protocol for providing this information may range in complexity. For example, a client device may indicate to AP 105 yes or no that it supports enough suppression in the muted subcarriers that it can operate in any regulatory domain. In other embodiments, a client device's puncturing performance may be described and reported to AP 105 by different classes. For example, the classes may map 1:1 to different regulatory domains. Client devices may indicate the most difficult class that they support (if sortable) and/or a bitmap of which classes they support, which may work for all cases. In yet other embodiments, the client devices may report to AP 105 a single transition bandwidth (e.g., in MHz) and depth (e.g., in dB) tuple indicating how deep and sharp it may make its puncturing. Furthermore, since the null may be curved, the client device may report multiple tuples to more fully identify the shape of the puncturing. In other embodiments, AP 105 may interrogate the client devices. For example, AP 105 may indicate a desired puncturing depth, and the client device may indicate the transition bandwidth (or start and stop frequencies) of the edge of its puncturing. Vice versa, AP 105 may indicate the bandwidth of the radar and the client device may indicate the puncturing depth that it can achieve throughout the bandwidth of interest.

Embodiments of the disclosure may, as an alternative to client devices advertising (i.e., reporting) their information (e.g., PSD information), AP 105 may perform Over-the-Air (OTA) tests to determine the filtering quality of plurality of client devices 115. In contrast to the aforementioned reporting process, the OTA testing process may not require standards changes. This OTA testing may be performed, for example, by assigning Uplink (UL) Orthogonal Frequency Division Multiple Access (OFDMA) subcarriers to a client device that include a gap, mimicking puncturing on a detected radar subchannel. By measuring the difference in energy between the client device's assigned subchannels (specified by the UL OFDMA subcarriers) and the nulled subchannels, AP 105 may infer the client device's filtering quality. AP 105 may also inspect the level of a client device's sidelobes of a transmission of contiguous subcarriers.

The client device's sidelobe level may depend on bandwidth, Modulation and Coding Scheme (MCS), and specified power. AP 105 may test the client device's PSD in the worst case or in a range of cases to determine its characteristics.

After this measurement, the client devices may be pre-classified and pre-negotiated into groups based on their filtering quality. As will be described in greater detail below, once radar is detected on a channel, broadcast or multicast messages may be transmitted notifying each class of their required action. Client devices' understanding of the group announcement mechanism may require standards support, which may be avoided by sending unicast (extended) channel switch announcement frames.

Figure 3:
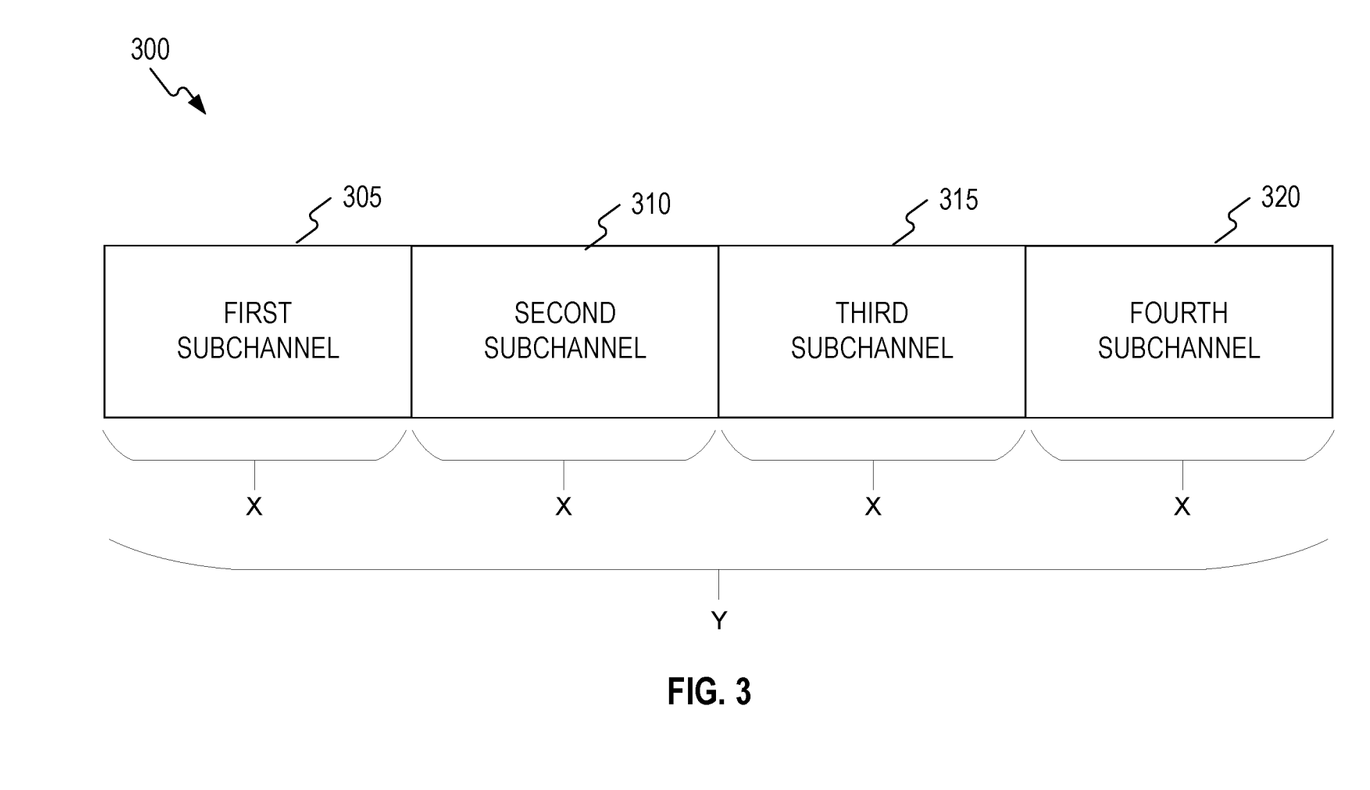
FIG. 3 illustrates a frequency range of a channel.

From stage 210, where access point 105 classifies first client device 120 as eligible for puncturing and second client device 125 as not eligible for puncturing, method 200 may advance to stage 220 where access point 105 may determine that a subchannel in a bandwidth range should not be used. For example, FIG. 3 illustrates a channel 300 that has a bandwidth range Y. Y may comprise, but is not limited to 80 MHz. Channel 300 may be divided into a plurality of subchannels. These subchannels may comprise a first subchannel 305, a second subchannel 310, a third subchannel 315, and a fourth subchannel 320. Channel 300 may be divided into any number of subchannels and is not limited to four. The subchannels shown in FIG. 3 may have a bandwidth of X. X may comprise, but is not limited to 20 MHz. Consistent with embodiments of the disclosure, AP 105 may detect radar in fourth subchannel 320 and as a result may determine that fourth subchannel 320 should not be used.

After access point 105 determines that the subchannel (e.g., fourth subchannel 320) in the bandwidth range should not be used in stage 220, method 200 may proceed to stage 230 where AP 105 may steer, in response to determining that the subchannel in the bandwidth range should not be used, first client device 120 to a first subset of the bandwidth range and second client device 125 to a second subset of the bandwidth range. The second subset of the bandwidth range may be smaller than the first subset of the bandwidth range. For example, once client devices are classified, they may be invited to use different channel bandwidths depending on their capability and eligibility for puncturing.

As stated above, AP 105 may detect radar in fourth subchannel 320 and, as a result, may determine that fourth subchannel 320 should not be used. Due to the previous classification of first client device 120 as being eligible for puncturing and after determining that first client device 120 has the ability to perform quality filtering of fourth subchannel 320 (i.e., can filter the needed transition bandwidth and depth), AP 105 may steer first client device 120 to the first subset of the bandwidth range. For example, the first subset of the bandwidth range may comprise first subchannel 305, second subchannel 310, and third subchannel 315. While in this example the first subset of the bandwidth range may comprise contiguous subchannels (i.e., first subchannel 305, second subchannel 310, and third subchannel 315), embodiments of the disclosure are not limited to contiguous subchannels, and noncontiguous subchannels may be used in the first subset of the bandwidth range consistent with other example embodiments of the disclosure.

Similarly, due to the previous classification of second client device 125 as not being eligible for puncturing and after determining that second client device 125 does not have the ability to perform quality filtering of fourth subchannel 320 (i.e., may not filter the needed transition bandwidth and depth) or may not be capable of puncturing at all, AP 105 may steer second client device 125 to the second subset of the bandwidth range. For example, the second subset of the bandwidth range may comprise first subchannel 305 and second subchannel 310. In the case of insufficient filtering quality, client device 125 may not be able to filter out fourth subchannel 320 to a high enough degree while maintaining the required transmission quality on the other three subchannels. In the case of lack of puncturing support, client device 125 may be relegated to standards defined channel configurations (e.g., 802.11, which supports 40 MHz and 80 MHz channel configurations but not 60 MHz). Accordingly in both cases, AP 105 may steer second client device 125 to the second subset of the bandwidth range having just first subchannel 305 and second subchannel 310. In this example, the first subset of the bandwidth range may comprise 60 MHz and the second subset of the bandwidth range may comprise 40 MHz.

Described below are embodiments of the disclosure for steering the client devices to their respective bandwidths, some of which may require additions to the standard specifications, and some of which may use current protocol fields. Standard specification support may be needed for capability-based and eligibility-based bandwidth announcements.

With respect to capability-based bandwidth announcements, when the AP advertises a lower bandwidth for legacy clients and clients that do not support puncturing (e.g., via the High Throughput (HT)/Very High Throughput (VHT) operation elements), AP 105 may also announce a new information element that includes a larger bandwidth and a puncturing indication (e.g., bitmap, or start and stop frequencies, etc.) specifically for client devices that support puncturing. In other embodiments, the element may specify a minimum filtering requirement that would make a client device eligible for using the larger bandwidth. In yet other embodiments, the element may specify the pre-negotiated classifications that are eligible for the larger bandwidth. This element may be announced in beacons and may be used in conjunction with the element that advertises the subcarriers that are to be punctured in the BSS.

With respect to client-specific bandwidth announcements, new information elements may be set by AP 105, taking into account each client device's eligibility based on the filtering quality and the radar signal's center frequency and bandwidth for example.

New elements in, for example, the groupcast Channel-Switch Announcements (CSA) and/or Extended CSA (ECSA) frames may allow AP 105 to announce changes in bandwidths that are dependent on either client device capabilities in puncturing, minimum filtering requirements, or client device classification in filtering quality. This may allow client devices to be notified of the upcoming punctured or non-punctured bandwidth (depending on client devices' puncturing eligibility) prior to the channel switch. In other embodiments, AP 105 may send each CSA or ECSA frame in a unicast manner or some hybrid of both unicast and groupcast.

Described below are embodiments of the disclosure for steering the client devices to their respective bandwidths that may not require standards support, in contrast to capability-based or eligibility-based bandwidth announcements. In some embodiments, AP 105 may announce a reduced bandwidth for the BSS to serve the clients that are not eligible for puncturing, and may reserve a new Basic Service Set Identifier (BSSID) to serve the clients that are eligible for puncturing. The new BSSID may utilize the entire original bandwidth (i.e., the bandwidth prior to the puncturing determination), may announce puncturing for the radar detected subchannel (e.g., fourth subchannel 320), and may advertise the original Service Set Identifier (SSID) (i.e., the same SSID that the original BSSID uses). This new BSSID may be on the same radio as the original BSSID or on a different radio. Steering may comprise inviting the client devices that are eligible for puncturing to the new BSSID (e.g., using methods such as 802.11v BSS Transition). In other embodiments, the new BSSID may serve the client devices that are not eligible for puncturing and the client devices that are eligible for puncturing may be left on the old BSSID.

Once access point 105 steers first client device 120 to the first subset of the bandwidth range and second client device 125 to the second subset of the bandwidth range in stage 230, method 200 may then end at stage 240.

Figure 4:
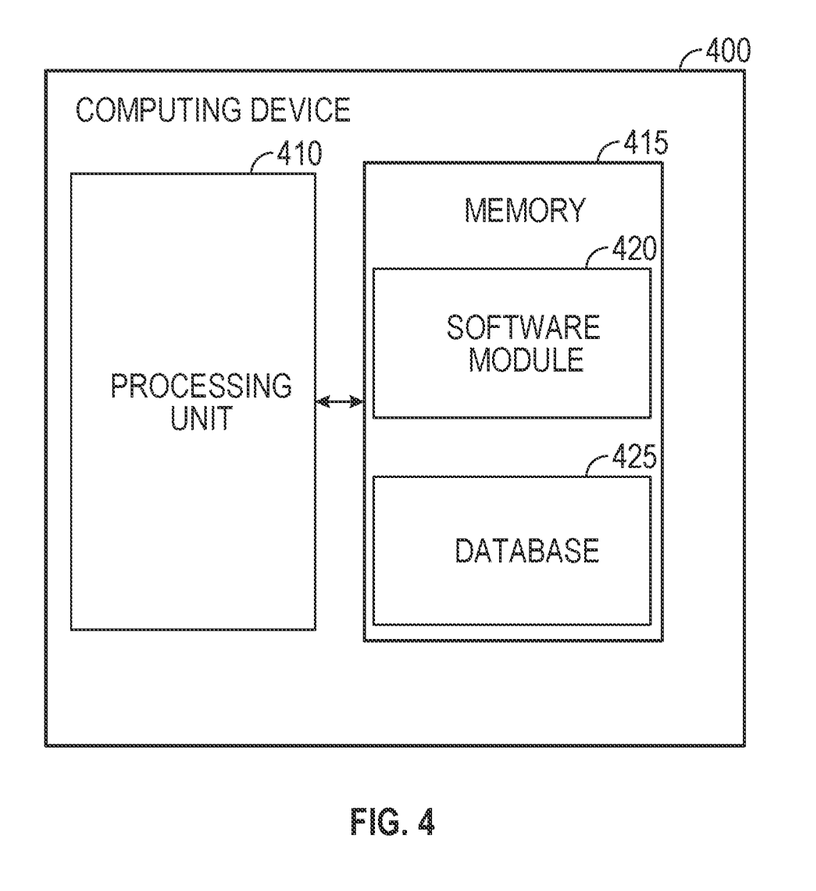
FIG. 4 is a block diagram of a computing device.

FIG. 4 shows computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for bypassing radar in wide Dynamic Frequency Selection (DFS) channels utilizing puncturing as described above with respect to FIG. 2. Computing device 400, for example, may provide an operating environment for AP 105, first client device 120, second client device 125, third client device 130, fourth client device 135, or fifth client device 140. AP 105, first client device 120, second client device 125, third client device 130, fourth client device 135, and fifth client device 140 may operate in other environments and are not limited to computing device 400.

Computing device 400 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
classifying a first client device as eligible for puncturing, wherein classifying the first client device as eligible for puncturing comprises performing over-the-air testing on the first client device to determine a filtering quality corresponding to the first client device wherein performing the over-the-air testing on the first client device comprises measuring a difference in energy between the first client device's at least one assigned subchannel and at least one nulled subchannel;
classifying a second client device as not eligible for puncturing, wherein classifying the second client device as not eligible for puncturing comprises performing over-the-air testing on the second client device to determine a filtering quality corresponding to the second client device wherein performing the over-the-air testing on the second client device comprises measuring a difference in energy between the second client device's at least one assigned subchannel and at least one nulled subchannel;
determining that a subchannel in a bandwidth range should not be used; and
steering, in response to determining that the subchannel in the bandwidth range should not be used, the first client device to a first subset of the bandwidth range and the second client device to a second subset of the bandwidth range, wherein the second subset of the bandwidth range is smaller than the first subset of the bandwidth range.

2. The method of claim 1, wherein determining that the subchannel in the bandwidth range should not be used comprises determining that the subchannel in the bandwidth range should not be used in response to detecting radar on the subchannel.

3. The method of claim 1, wherein steering the first client device to the first subset of the bandwidth range comprises advertising a capability-based bandwidth announcement comprising an element direct to puncturing-eligible clients.

4. The method of claim 1, wherein steering the first client device to the first subset of the bandwidth range comprises making a client-specific bandwidth announcement to the first client device.

5. The method of claim 1, wherein:
steering the first client device to the first subset of the bandwidth range comprises providing a first Basic Service Set (BSS) for the first client device, the first BSS corresponding to the first subset of the bandwidth range; and
steering the second client device to the second subset of the bandwidth range comprises providing a second BSS for the second client device, the second BSS corresponding to the second subset of the bandwidth range.

6. A system comprising:
a memory storage; and
a processing unit coupled to the memory storage, wherein the processing unit is operative to:
classify a first client device as eligible for puncturing, wherein the processing unit being operative to classify the first client device as eligible for puncturing comprises the processing unit being operative to perform over-the-air testing on the first client device to determine a filtering quality corresponding to the first client device wherein the processing unit being operative to perform the over-the-air testing on the first client device comprises the processing unit being operative to measure a difference in energy between the first client device's at least one assigned subchannel and at least one nulled subchannel;
classify a second client device as not eligible for puncturing, wherein the processing unit being operative to classify the second client device as not eligible for puncturing comprises the processing unit being operative to perform over-the-air testing on the second client device to determine a filtering quality corresponding to the second client device wherein the processing unit being operative to perform the over-the-air testing on the second client device comprises the processing unit being operative to measure a difference in energy between the second client device's at least one assigned subchannel and at least one nulled subchannel;
determine that a subchannel in a bandwidth range should not be used; and
steer, in response to determining that the subchannel in the bandwidth range should not be used, the first client device to a first subset of the bandwidth range and the second client device to a second subset of the bandwidth range, wherein the second subset of the bandwidth range is smaller than the first subset of the bandwidth range.

7. The system of claim 6, wherein the processing unit being operative to determine that the subchannel in the bandwidth range should not be used comprises the processing unit being operative to determine that the subchannel in the bandwidth range should not be used in response to detecting radar on the subchannel.

8. The system of claim 6, wherein the processing unit being operative to steer the first client device to the first subset of the bandwidth range comprises the processing unit being operative to advertise a capability-based bandwidth announcement comprising an element direct to puncturing-eligible clients.

9. The system of claim 6, wherein the processing unit being operative to steer the first client device to the first subset of the bandwidth range comprises the processing unit being operative to make a client-specific bandwidth announcement to the first client device.

10. The system of claim 6, wherein:
the processing unit being operative to steer the first client device to the first subset of the bandwidth range comprises the processing unit being operative to provide a first Basic Service Set (BSS) for the first client device, the first BSS corresponding to the first subset of the bandwidth range; and
the processing unit being operative to steer the second client device to the second subset of the bandwidth range comprises the processing unit being operative to provide a second BSS for the second client device, the second BSS corresponding to the second subset of the bandwidth range.

11. A non-transitory computer-readable medium that stores a set of instructions which when executed perform a method, the method executed by the set of instructions comprising:
classifying a first client device as eligible for puncturing, wherein classifying the first client device as eligible for puncturing comprises performing over-the-air testing on the first client device to determine a filtering quality corresponding to the first client device wherein performing the over-the-air testing on the first client device comprises measuring a difference in energy between the first client device's at least one assigned subchannel and at least one nulled subchannel;
classifying a second client device as not eligible for puncturing, wherein classifying the second client device as not eligible for puncturing comprises performing over-the-air testing on the second client device to determine a filtering quality corresponding to the second client device wherein performing the over-the-air testing on the second client device comprises measuring a difference in energy between the second client device's at least one assigned subchannel and at least one nulled subchannel;
determining that a subchannel in a bandwidth range should not be used; and
steering, in response to determining that the subchannel in the bandwidth range should not be used, the first client device to a first subset of the bandwidth range and the second client device to a second subset of the bandwidth range, wherein the second subset of the bandwidth range is smaller than the first subset of the bandwidth range.

12. The non-transitory computer-readable medium of claim 11, wherein determining that the subchannel in the bandwidth range should not be used comprises determining that the subchannel in the bandwidth range should not be used in response to detecting radar on the subchannel.

13. The non-transitory computer-readable medium of claim 11, wherein steering the first client device to the first subset of the bandwidth range comprises advertising a capability-based bandwidth announcement comprising an element direct to puncturing-eligible clients.

14. The non-transitory computer-readable medium of claim 11, wherein steering the first client device to the first subset of the bandwidth range comprises making a client-specific bandwidth announcement to the first client device.

15. The non-transitory computer-readable medium of claim 11, wherein:
steering the first client device to the first subset of the bandwidth range comprises providing a first Basic Service Set (BSS) for the first client device, the first BSS corresponding to the first subset of the bandwidth range; and
steering the second client device to the second subset of the bandwidth range comprises providing a second BSS for the second client device, the second BSS corresponding to the second subset of the bandwidth range.

* * * * *